United States Patent
Linsmeier et al.

(10) Patent No.: US 8,333,390 B2
(45) Date of Patent: Dec. 18, 2012

(54) RIDE-HEIGHT CONTROL SYSTEM

(75) Inventors: Catherine R. Linsmeier, Larsen, WI (US); Erik S. Ellifson, Oshkosh, WI (US); Kevin W. Magners, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 120 days.

(21) Appl. No.: 12/165,473

(22) Filed: Jun. 30, 2008

(65) Prior Publication Data

US 2009/0033044 A1   Feb. 5, 2009

Related U.S. Application Data (60) Provisional application No. 60/958,332, filed on Jul. 3, 2007.

(51) Int. Cl.
*B60G 17/0195* (2006.01)

(52) U.S. Cl. .................. 280/5.514; 280/6.157

(58) Field of Classification Search ............ 280/5.515, 280/6.151, 6.153, 6.154, 6.155, 6.157
See application file for complete search history.

(56) References Cited

U.S. PATENT DOCUMENTS

| | | | | |
|---|---|---|---|---|
| 2,907,575 A * | 10/1959 | Locker | ............ | 280/43.2 |
| 4,659,104 A * | 4/1987 | Tanaka et al. | ............ | 280/6.158 |
| 4,733,876 A * | 3/1988 | Heider et al. | ............ | 280/6.158 |
| 4,826,141 A * | 5/1989 | Buma et al. | ............ | 267/64.28 |
| 4,834,418 A * | 5/1989 | Buma et al. | ............ | 280/124.106 |
| 5,028,088 A * | 7/1991 | Del Monico et al. | ...... | 296/26.04 |
| 5,322,321 A * | 6/1994 | Yopp | ............ | 280/6.158 |
| 6,015,155 A * | 1/2000 | Brookes et al. | ............ | 280/5.505 |
| 6,619,673 B2 * | 9/2003 | Eckelberry et al. | ......... | 280/6.151 |
| 6,848,693 B2 * | 2/2005 | Schneider | ............ | 280/6.153 |
| 7,198,130 B2 * | 4/2007 | Schimke | ............ | 180/291 |
| 7,246,835 B1 * | 7/2007 | Colburn et al. | ............ | 296/26.04 |
| 7,380,800 B2 * | 6/2008 | Klees | ............ | 280/5.519 |
| 7,425,891 B2 * | 9/2008 | Colburn et al. | ............ | 340/438 |
| 7,611,153 B2 * | 11/2009 | Kim et al. | ............ | 280/5.514 |
| 7,611,154 B2 * | 11/2009 | Delaney | ............ | 280/6.15 |
| 7,624,995 B2 * | 12/2009 | Barbison | ............ | 280/6.153 |
| 7,681,892 B1 * | 3/2010 | Crews et al. | ............ | 280/33.997 |
| 2002/0130771 A1 * | 9/2002 | Osborne et al. | ............ | 340/438 |
| 2003/0155164 A1 * | 8/2003 | Mantini et al. | ............ | 180/209 |
| 2004/0113377 A1 * | 6/2004 | Klees | ............ | 280/5.514 |
| 2005/0034911 A1 * | 2/2005 | Darby | ............ | 180/209 |
| 2005/0062239 A1 * | 3/2005 | Shore | ............ | 280/6.157 |
| 2005/0093265 A1 * | 5/2005 | Niaura et al. | ............ | 280/124.16 |
| 2005/0110229 A1 * | 5/2005 | Kimura et al. | ............ | 280/5.514 |
| 2005/0161891 A1 * | 7/2005 | Trudeau et al. | ............ | 280/5.507 |
| 2006/0082079 A1 * | 4/2006 | Eichhorn et al. | ............ | 280/6.155 |
| 2006/0244225 A1 * | 11/2006 | Power et al. | ............ | 280/6.151 |
| 2006/0273566 A1 * | 12/2006 | Hepner et al. | ............ | 280/756 |
| 2007/0120334 A1 * | 5/2007 | Holbrook | ............ | 280/6.157 |

(Continued)

*Primary Examiner* — Eric Culbreth
*Assistant Examiner* — Barry Gooden, Jr.
(74) *Attorney, Agent, or Firm* — Foley & Lardner LLP (57) ABSTRACT

In some embodiments, a land vehicle includes sensors that provide information relating to a ride height of the land vehicle. A processing circuit monitors data from the sensors and controls adjustment of one or more vehicle systems that affect the vehicle's ride height based on the data from the sensors. In some embodiments, the processing circuit controls a suspension system and can control the suspension system to have any of a multiplicity of height settings. In some embodiments, the processing circuit controls the ride height based on a user selection of a pre-configured ride height setting. In some embodiments, the processing circuit is configured to maintain a ride height of the vehicle at a consistent ride height when the suspension is unlocked after a load is removed where the suspension was locked after the load was added.

31 Claims, 3 Drawing Sheets

U.S. PATENT DOCUMENTS

| | | | |
|---|---|---|---|
| 2007/0158920 A1* | 7/2007 | Delaney | 280/5.514 |
| 2007/0246902 A1* | 10/2007 | Trudeau et al. | 280/6.16 |
| 2008/0017426 A1* | 1/2008 | Walters et al. | 180/65.2 |
| 2008/0252025 A1* | 10/2008 | Plath | 280/5.514 |
| 2008/0284118 A1* | 11/2008 | Venton-Walters et al. | 280/6.154 |
| 2011/0114409 A1* | 5/2011 | Venton-Walters | 180/254 |

* cited by examiner

RIDE-HEIGHT CONTROL SYSTEM

CROSS-REFERENCE TO RELATED APPLICATIONS

The present application claims priority under 35 U.S.C. § 119(e) to U.S. Patent Application No. 60/958,332 filed Jul. 3, 2007, the disclosure of which is hereby incorporated by reference in its entirety.

SUMMARY

One embodiment relates to a vehicle. The vehicle includes sensors configured to provide information relating to a ride height of the vehicle, and a processing circuit. The processing circuit is configured to monitor data from the sensors and to output a signal configured to cause adjustment of one or more vehicle systems that affect the vehicle's ride height based on the data from the sensors.

Another embodiment is directed to a vehicle. The vehicle includes a suspension system connected to at least one wheel of a vehicle, and a processing circuit configured to control the suspension system, wherein the processing circuit can control the suspension system to have any of a multiplicity of height settings.

Another embodiment is directed to a vehicle. The vehicle includes a ride height control system configured to adjust a ride height of the vehicle, and a processing circuit. The processing circuit is configured to output a signal configured to control the ride height control system. The processing circuit is configured to control the ride height control system based on receipt of a user input corresponding to one of a multiplicity of pre-configured ride height settings stored by the processing circuit.

Another embodiment is directed to a vehicle that includes a processing circuit configured to continuously monitor data from a sensor coupled to a system of the vehicle that is connected to the wheels of the vehicle, and to automatically adjust the system based on the data.

Another embodiment is directed to a vehicle that includes a processing circuit configured to continuously monitor data from a sensor that provides information related to a ride height of the vehicle, and to automatically control adjustment of a system of the vehicle that is configured to adjust ride height based on the data.

Another embodiment is directed to a vehicle configured to carry a load such that the load can be unloaded. The vehicle includes a processing circuit configured to control one or more vehicle systems such that the processing circuit can maintain a ride height of the vehicle at a consistent ride height when the suspension is unlocked after a load is removed where the suspension was locked after the load was added.

Another embodiment is directed to a vehicle. The vehicle includes a means for adjusting a ride height of the vehicle, and a means for allowing a user to remotely control the ride height of the vehicle to a multiplicity of ride heights.

Another embodiment is directed to a vehicle. The vehicle includes a processing circuit configured to monitor data and provide output signals such that the vehicle is maintained at a ride height at a pre-selected level using an active feedback system.

DETAILED DESCRIPTION OF THE PREFERRED EMBODIMENTS

A land vehicle, such as a truck, may have a ride height that is adjustable to allow a user to select a desired ride height. Ride height generally refers to the height at which the vehicle rides. Ride height is typically measured based on the distance from the center of the axle to the rails. A change in ride height is generally a change in this value.

Vehicles may have any range of ride heights. In an exemplary embodiment, the value of the maximum ride height of the vehicle is less than about 40 inches. In some of these embodiments, the value of the maximum ride height is less than about 30 inches, and/or less than about 25 inches (e.g. about 20 inches). In some exemplary embodiments, the value of the minimum ride of a vehicle is at least about 1 inch. In some of these embodiments, the value of the minimum is at least about 5 inches and/or at least about 10 inches (e.g. about 11 inches). In other embodiments, the minimum may be below 1 inch and/or above 40 inches. As long as not incompatible, any of the above ride height maximum and minimum limits can be used in conjunction with each other. The ride height selected may be input directly, may be indirectly computed from other information that is input, may be calculated based on conditions, and/or may be determined in some other manner.

The various embodiments of this adjustable ride height may be used in any number of vehicles, particularly in trucks such as fire trucks, snow removal vehicles, refuse handling vehicles, cement/concrete mixers, on/off road severe duty equipment service vehicles, etc. In some contemplated embodiments, the adjustable ride height is used in military vehicles such as heavy duty and other military trucks.

Figure 1:
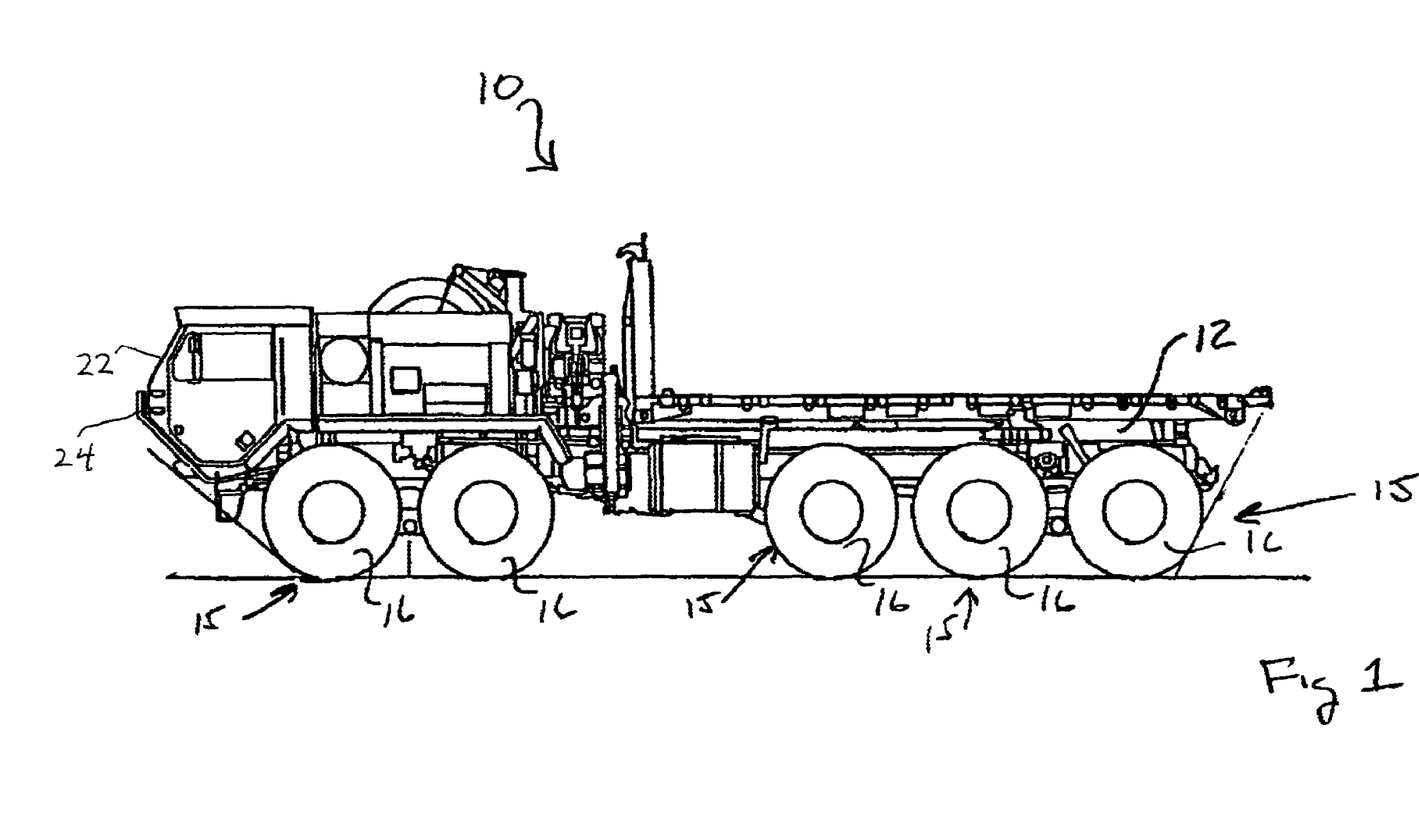
FIG. 1 is an illustration of a truck which can include an adjustable ride height according to one embodiment.

Referring to FIG. 1, a heavy duty truck 10 (e.g. a military transport truck) may include a ride height adjustment and control system as described below. FIG. 1 shows various features of an exemplary truck such as the suspension system, the cabin 22 with the v-shaped front 24, the load carrying components, the fuel tank, the multiple (e.g. at least 3, 5, 8, and/or 10) sets 15 of wheels 16, frame 12, the steering shaft, and various other features which are apparent from the figures.

Power may be provided to various components (including processing circuit 222 —FIG. 2) through automatic reset circuit breakers from the vehicle's power system. In some embodiments, the vehicle's power system has an operating voltage of at least about 16 volts and/or at least about 20 volts (e.g. a 24-volt charging system).

Figure 2:
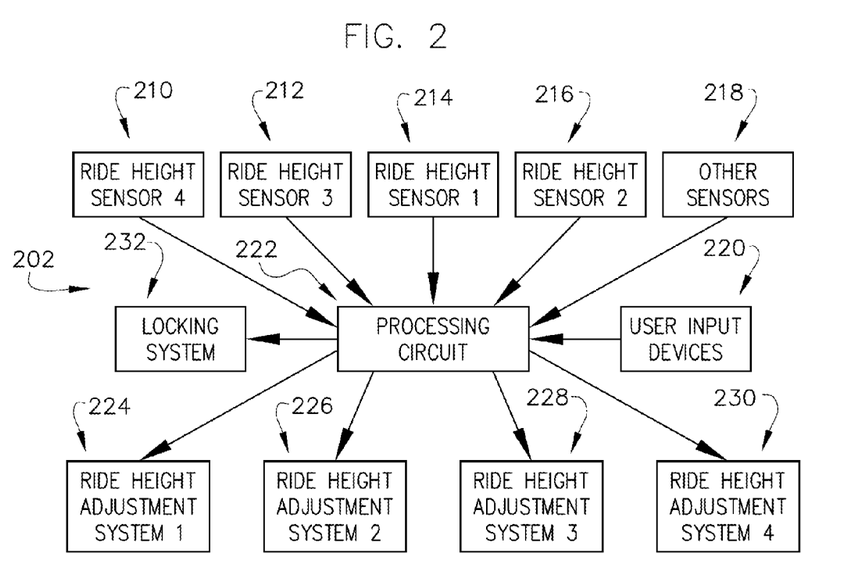
FIG. 2 is a schematic illustration of a ride height control system according to one embodiment.

Referring to FIG. 2, a system 202 for monitoring and/or adjusting the ride height of the vehicle includes one or more sensors 210-216 configured to provide information relating to a ride height of the vehicle. The information from sensors 210-216 are provided to processing circuit 222 such that processing circuit can continuously monitor and/or adjust the ride height of the vehicle. Processing circuit 222 may also be configured to receive data based on a user input relating to a ride height of the vehicle from a user input device 220, and may use the user input as a basis for controlling ride height adjustment systems 224-230 which are configured to adjust (e.g. raise and/or lower) the ride height of the vehicle. The system 202 may also include other sensors 218 which can provide information relating to other criteria that may affect adjustment of the ride height of the vehicle.

Sensors 210-216 may provide information relating to different parts of the vehicle. For example, a first sensor 214 may provide information relating to a front left side of the vehicle, a second sensor 216 may provide information relating to a front right side of the vehicle, a third sensor 212 may be configured to provide information relating to a back left side of the vehicle, and a fourth sensor 210 may be configured to provide information relating to a back right side of the vehicle. The first through fourth sensors 210-216 may be completely independent or the sensors 210-216 may share common components. For example, ride height of a first portion of the vehicle may be measured absolutely by a first sensor 214, while a second sensor 216 measures ride height of a second portion of the vehicle relative to the ride height of the first portion of the vehicle, such that the ride height of the second portion of the vehicle is determined in part based on data from both of the first and second sensors 214, 216. As another example, ride height of a first portion of the vehicle may be measured absolutely by a first sensor 214, ride height of a second portion of the vehicle may be measured absolutely by a second sensor 214, and the accuracy of the first and second sensors may be checked using a sensor (e.g. tilt sensor) that measures the relative heights of the first portion of the vehicle and the second portion of the vehicle.

In some embodiments, the sensors 210-216 may be piezoelectric sensors that measure a change in current. In other embodiments, the sensors may include radio frequency devices which provide distance information based on an amount of time it takes to transmit and receive a message, may be optical range finding devices, may include mechanical wheels that are configured to rotate as the ride height is raised and lowered, may be optical sensors configured to count tick marks as the vehicle is raised and lowered, may be barometric sensors, may be pressure sensors, and/or may include any other type of sensor capable of providing information relating to ride height. Further, a sensor 210 may include multiple sensors configured to provide information relating to ride height. The multiple sensors may each provide a piece of information that, when combined, provides information indicative of ride height, each sensor may individually provide information indicative of ride height, and/or may be include a combination of these types of information.

Sensors 210-218 may be configured to output analog data signals, may be configured to output digital data signals, may be configured to output raw data, may be configured to output processed (e.g. filtered, evaluated, etc.) signals, and/or may be configured to provide some other type of data signal containing information related to the ride height of the vehicle.

Processing circuit 222 may be configured to monitor data from the sensors 210-218 and to calculate ride height based on the data from the sensors. Processing circuit 222 may also be configured to send control signals to one or more of ride height adjustment systems 224-230 to adjust the ride height of the vehicle. When multiple ride height adjustment systems 224-230 are included on the vehicle, two or more of the ride height adjustment systems might be caused to adjust ride height simultaneously or two or more of the systems might be adjusted substantially consecutively (e.g. using the "ladder" adjustment method discussed below).

In some embodiments, processing circuit 222 may be configured to continuously monitor data (e.g. signals) from sensors 210-218. Processing circuit may actively monitor the sensors at pre-set periods, may monitor when triggered by data from the sensors, etc. Processing circuit 222 may be configured to always be continuously monitoring, may be configured to continuously monitor when based on activation of a switch, input of a mode, or based on some other user input. Processing circuit 222 may be configured to cause adjustment of the ride height based on the data monitored from the sensors. Processing circuit 222 may be configured to actively control adjustment of the ride height based on every deviation in ride height measured from the sensors, or may be configured to control adjustment when a deviation in ride height has met a criteria (e.g. exceed a threshold amount). In some of these embodiments, processing circuit 222 may be configured to maintain the ride height of the vehicle at a pre-selected level by continuously monitoring ride height data from the sensors 210-218 and controlling adjustment of the ride height of the vehicle. As an alternative to (or in addition to) automatically adjusting ride height based on monitored data, processing circuit 222 could be configured to provide a user with a warning or other notification when the ride height selected by a user does not match the current ride height as judged by the data continuously monitored from the sensors.

In some embodiments, processing circuit 222 may be configured to solely (or primarily) monitor and/or control ride height of the vehicle. In other embodiments, processing circuit 222 may be configured to perform functions in addition to monitoring and/or controlling ride height. For example, processing circuit 222 may be part of and/or share components in common with a central vehicle monitoring and/or control system (not shown). Processing circuit 222 may be configured to monitor and/or control one or more functions including automatic suspension adjustment, suspension not level monitoring and/or adjustment, front up, front down, rear up, rear down, and lock/unlock commands for electronic operations.

Processing circuit 222 may be part of the only system of the vehicle configured to control and/or adjust ride height, or may be part of one of a plurality of systems of the vehicle which are configured to control and/or adjust ride height. While shown as both monitoring and controlling/adjusting ride height, in some embodiments processing circuit 222 may be configured such that it controls/adjusts ride height, but does not monitor ride height. In other embodiments, processing circuit 222 may be configured to monitor ride height, but not to control/adjust ride height.

Processing circuit 222 of hand-held device 10 may include one or more of a microprocessor, image processing circuit, display driver, NVM controller, audio driver (e.g. D/A converter, A/D converter, an audio coder and/or decoder (codec), amplifier, etc.), and other processing circuits. Processing circuit 222 can include various types of processing circuitry, digital and/or analog, and may include one or more of a microprocessor, microcontroller, application-specific integrated circuit (ASIC), field programmable gate array (FPGA), or other circuitry configured to perform various input/output, control, analysis, and other functions. In various embodiments, the processing circuit 222 may include a central processing unit (CPU) using any suitable processor or logic device, such as a as a general purpose processor. Processing circuit 222 may include, or be implemented as, a chip multiprocessor (CMP), dedicated processor, embedded processor, media processor, input/output (I/O) processor, co-processor, a microprocessor such as a complex instruction set computer (CISC) microprocessor, a reduced instruction set computing (RISC) microprocessor, and/or a very long instruction word (VLIW) microprocessor, a processor implementing a combination of instruction sets, a controller, a microcontroller, an application specific integrated circuit (ASIC), a field programmable gate array (FPGA), a programmable logic device (PLD), and/or other processing device in accordance with the described embodiments.

Processing circuit 222 may be configured to digitize data, to filter data, to analyze data, to combine data, to output command signals, and/or to process data in some other manner. Processing circuit 222 may be configured to perform digital-to-analog conversion (DAC), analog-to-digital conversion (ADC), modulation, demodulation, encoding, decoding, encryption, decryption, etc. Processing circuit 222 (e.g. a microprocessor) may be configured to execute various software programs such as application programs and system programs to provide computing and processing operations for the system.

Processing circuit 222 may also include a memory that stores data. Processing circuit may include only one of a type of component (e.g. one microprocessor), or may contain multiple components of that type (e.g. multiple microprocessors). Processing circuit 222 could be composed of a plurality of separate circuits and discrete circuit elements. In some embodiments, processing circuit 222 will essentially comprise solid state electronic components such as a microprocessor (e.g. microcontroller). Processing circuit 222 may be mounted on a single board in a single location or may be spread throughout multiple locations which cooperate to act as processing circuit 222. In some embodiments, processing circuit 222 may be located in a single location and/or all the components of processing circuit 222 will be closely connected.

Components shown as part of a single processing circuit 222 in the figures may be parts of separate processing circuits in various embodiments covered by the claims unless limited by the claim to a single processing circuit.

If a processing circuit 222 uses software (e.g. a software programmed microprocessor), the software may be programmed in any computer language, such as C and C++.

The target ride height for processing circuit 222 (the ride height at which processing circuit 222 is configured to adjust and/or maintain the vehicle) may be based on a user input provided to processing circuit 222 from a user input device 220. In some embodiments, the user may input a desired ride height and the processing circuit may be configured to control the ride height adjustment mechanisms 224-230 to adjust the ride height of the vehicle to the selected ride height. Processing circuit 222 may be configured to determine that the vehicle has reached the selected ride height based on data received from sensors 210-218.

In some embodiments the user input may be holding a control 220 indicative of a desire to raise or lower the ride height (e.g. holding a switch "up" to adjust the ride height up, scrolling counter-clockwise with a button or on a touch screen). Processing circuit 222 may be configured to continue to adjust the ride height as directed until the control 220 is released. The control 220 may affect the overall ride height of the vehicle or may only affect a zone of the vehicle (e.g. front, rear, front left, front right, rear left, rear right, etc.).

In some embodiments, the user may input non-ride height information (e.g. information that does not contain a ride height). Processing circuit 222 may be configured to receive the non-ride height information and translate that information into a target ride height. As one example, the user may input a function to achieve (e.g. a ride height suitable for loading the vehicle, a ride height for avoiding obstacles, etc.). Processing circuit 222 may be configured to adjust the ride height of the vehicle to achieve the function. As another example, discussed in more detail below, a user may place the vehicle into a mode, and processing circuit 222 may be configured to adjust the ride height of the vehicle in accordance with the mode. A mode selected by the user may relate only to the ride height of the vehicle, or may affect multiple systems of the vehicle.

The user input device may be any user input device such as a switch, a button, a voice command system, a touch screen (e.g. capacitive touch screen, light reflecting screen, etc.), a touchless input device, a camera-based device, etc. The user input device may be located proximate to the vehicle suspension system, may be remote from the vehicle suspension system (e.g. in a cab of the vehicle, in a wireless remote control, etc.), may be located on the exterior of the vehicle, may be located on the interior of the vehicle, may not be located on the vehicle, etc.

In some embodiments, all user inputs can be performed using control switches in the cab or on a load handling system remote control. In some embodiments, the user input devices 220 for adjusting ride height information consist essentially of control switches in the cab or on a load handling system remote control, but may also include an external switch in each zone to control that zone. In some embodiments, the system is designed such that the operator does not need to leave the cab of the vehicle to perform a ride height adjustment related function. In embodiments having separate zones (e.g. front and rear), the controls for the zones may be configured to be substantially the same (e.g. identical controls with some method of differentiating the zones such as location, ergonomics, etc.). Additionally, the controls for different zones may share common components.

In some embodiments, selection switches used on the system have a last selected priority. In some of these embodiments, the last selected priority operation may be not be strictly followed when a Load handling System (LHS) mode is active.

The user input device 220 may be dedicated to ride height adjustment or may control commands in addition to those related ride height. User input device 220 may comprise multiple user input devices (e.g. switches on the outside of the vehicle, a display in the cab of the vehicle, and a wireless remote control) which may be similar and/or may be different from each other. If multiple user input devices are used, processing circuit 222 may be configured to use a hierarchy to determine which command to follow (e.g. when commands from a remote wireless device and a device in the cab are inconsistent, the vehicle may implement the commands from the remote wireless device). The hierarchy could be used for all commands, or may be based on the type of command input (e.g. a ride height based on a mode selected by a user in the cab may be overridden by a control mounted on the outside of the vehicle which indicates that ride height should be adjusted).

The vehicle may include one or more addition sensors 218, and processing circuit 218 may be configured to receive data from (directly from or processed data based on signals from) these sensor(s) 218. Sensor 218 can be a level sensor, a speed sensor, a PTO engaged sensor, an obstacle detection sensor, etc. Processing circuit may be configured to control adjustment of the vehicle ride height based on data from one or more of sensors 218.

The various components may be directly connected (e.g. through data lines) or may be indirectly connected. As an example of indirect connection, processing circuit 222 may communicate commands to ride height adjustment systems 224-230 using a vehicle bus (e.g. the system may use J1939 communication protocols to monitor and control various system functions). In some embodiments, processing circuit 222 may be include communication modules to communicate with vehicle components over a network (e.g. using CAN 2.0b Physical Bus/J1939 Superset protocols such as those used by Oshkosh Truck). As another example, processing circuit 222 may be configured to receive data from sensors 210-218 over the vehicle bus. As another example, user input device 220 may be a wireless remote control having a transmitter (e.g. transceiver) configured to transfer data to a receiver (e.g. transceiver) that is connected (directly or indirectly) to processing circuit 222.

Ride height adjustment systems 224-230 may be any type of system configured to cause adjustment of the ride height of the vehicle. Ride height adjustment systems 224-230 may be configured to mechanically cause adjustment of ride height, may be configured to hydraulically cause adjustment, may be configured to pneumatically cause adjustment, and/or may cause adjustment by other means. Ride height adjustment systems 224-230 may be connected to an axle of the vehicle, may be connected to a vehicle frame and/or chassis, and/or may be connected to any other portion of the vehicle. Ride height adjustment systems 224-230 may receive signals directly from processing circuit 222 and/or may include additional processing and/or control circuits.

In one embodiment, ride height adjustment system 224 includes a hydraulic system configured to raise a suspension of the vehicle. Processing circuit 222 may be configured to send control signals that are configured to control (directly or indirectly) a pump of the hydraulic system. In another embodiment, ride height adjustment system 224 is comprised of a mechanical crank coupled to a mechanism that translates rotational movement of a shaft connected to the crank into linear motion for raising or lowering the ride height of the vehicle. Processing circuit 222 may be configured to send control signals that are configured to control (directly or indirectly) a motor configured to cause rotation of the shaft.

A vehicle may include multiple ride height adjustment systems 224-230 (e.g. for a vehicle that has multiple independently controllable zones, for a vehicle whose weight or balance requires multiple systems, for a vehicle that includes redundant systems, etc.). Ride height adjustment systems 224-230 may be all be the same type of system (e.g. one of those types listed above for ride height adjustment system 224) as each other, or may be different systems than each other.

Processing circuit 222 and ride height adjustment systems 224-230 may be configured to substantially achieve the target ride height, or may be configured to achieve the target ride height within a margin of error (e.g. within a margin of error whose value is less than about 2 inches and/or less than about 1 inch, or whose value is no more than about 0.5 inches).

In some embodiments, the system is implemented using the Oshkosh Truck Corporation Electronically Controlled Hydraulic Suspension System using Command Zone II hardware.

In some embodiments, the system can be used to control front and rear hydraulic suspension systems on a truck.

In some embodiments, the system is designed to raise and lower the truck depending on feedback from level sensors and pressure transducers and/or from operator interface.

Figure 3:
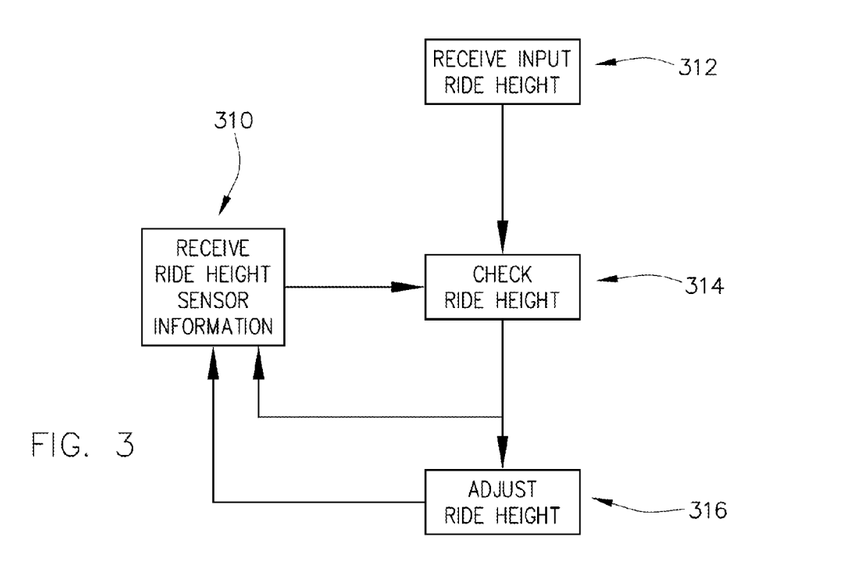
FIGS. 3-5 are various flow charts of programs implementable by a ride height control system according to various embodiments.

Referring to FIG. 3, processing circuit 222 (FIG. 2) may be configured to continuously monitor data from sensors and/or user inputs in order to control adjustment of the ride height. According to one embodiment, processing circuit 222 may be configured to receive ride height sensor information at block 310, and determine whether ride height should be adjusted at block 314. The determination of whether ride height should be adjusted at block 314 may be affected by a user input received at block 312. If the ride height should be adjusted, then processing circuit 222 may be configured to control adjustment of the ride height at block 316.

Figures 4, 5:
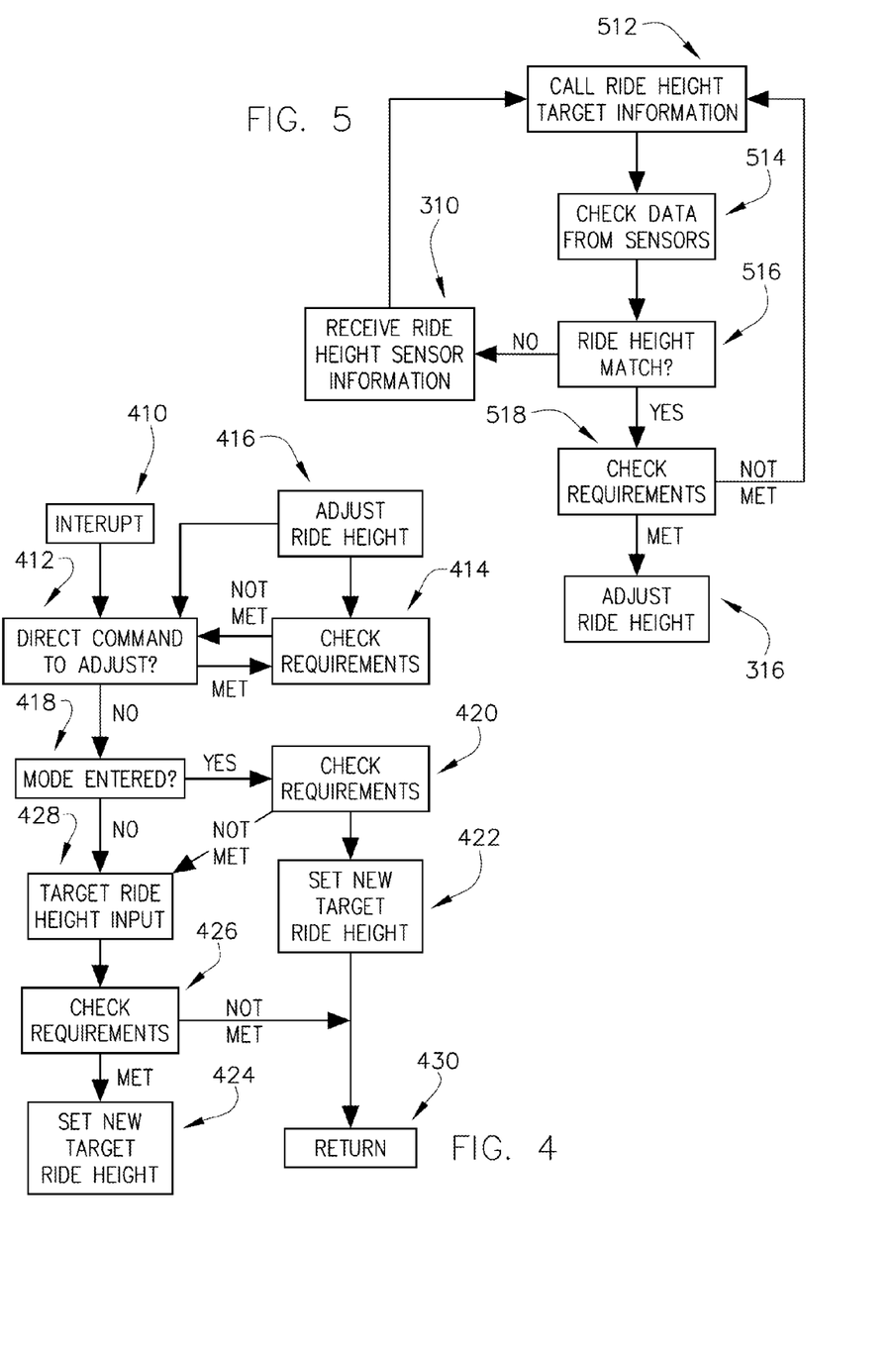

Referring to FIG. 4, in some embodiments, receiving a user input at block 312 (FIG. 3) may include receiving an interrupt 410 in response to a user input on a user input device 220 (FIG. 2). A check is made at block 412 to determine whether the user input is a direct command to adjust the ride height. If the user input is a direct command, then a check is made at block 414 to determine whether a direct adjustment can be made. The check at block 414 may include determining whether a speed criteria is met (e.g. going below a certain speed threshold), whether the ride height of the vehicle (or the zone of the vehicle to be adjusted) is locked, whether executing the command would result in an unacceptable ride height (e.g. beyond a ride height limit, causing the vehicle to be at an unacceptable angle, etc.), whether an overriding command has been received (e.g. a command from a user input device with a higher position in a hierarchy), whether the particular user input device on which the input was received has been placed in a "disabled" status, capability of a ride height adjustment system to adjust the ride height (e.g. sufficient pressure to raise a suspension), etc. The requirements to check may change (e.g. based on monitored vehicle conditions, based on input vehicle settings such as a vehicle mode, based on other inputs, etc.). If the requirements for making the adjustment have been met, then the ride height is adjusted at block 416. Adjusting the ride height may include adjusting the ride height for the whole vehicle, or adjusting only the ride height in a zone of the vehicle. Exemplary zones may include dividing the vehicle in quarters (e.g. dividing the vehicle based on front and back ends, and dividing each end based on left and right sides).

If there is no direct command to adjust the ride height at block 412, a determination is made whether the vehicle has been set to a mode (block 418) and/or whether a target ride height has been received from a user (block 428). If a new mode or target ride height has been set, the system checks to ensure that the requirements for the change are met at blocks 420 and 426, respectively. The requirements may include any of the requirements discussed above for block 414. Another requirement before making a change to the ride height might be receipt of a user input indicating that the ride height should be adjusted to the new target ride height (e.g. before making a change the system may look for a first user input that indicates the new target ride height and then look for a second user input which directs the system to execute the sequence necessary to adjust the vehicle to the new target ride height). The requirements checked in blocks 414, 420, and 426 may be the same as each other, two may be the same, or they may all be different. If the requirements are met at blocks 420 or 426, a new ride height target is set at blocks 422 or 424, respectively, and the system returns at block 430.

Referring to FIG. 5, in some embodiments, a method for determining whether ride height should be adjusted at block 314 (FIG. 3) could include calling the target ride height information stored by a memory (e.g. a non-volatile memory of processing circuit 222) at block 512, and processing the data received from one or more of the sensors 210-218 (FIG. 2) at block 514. Calling target ride height information at block 512 may include calling multiple ride height settings (e.g. where the system 202 stores separate ride height settings for different zones of the vehicle). Processing data from the sensor(s) at block 514 may include prompting the sensor(s) for information, may include receiving data from the sensor(s), may include calculating ride height based on the data from the sensor(s), may include comparing data from more than one sensor (e.g. to verify an accurate ride height has been calculated), may include combining data from more than one sensor, may include smoothing data from the sensor(s), and/or may include any other processing.

After receiving the target ride height information at block 512 and current ride height information from the sensors at block 514, a determination is made whether the current ride height matches the target ride height at block 516. The determination at block 516 could be a comparison for one ride height, two ride height zones, three ride height zones, four ride height zones, or more than four ride height zones. The match required by the determination may be an exact match, may be a match within a certain range around the target ride height, etc. The criteria for the determining whether there is a match may be dependent on time (e.g. a severe deviation in actual ride height for a short period may result in a mismatch while a minor deviation may need to be present for a longer duration to result in a mismatch). Mismatches in ride height might commonly occur when there is a new target ride height set at blocks 422 or 424 (FIG. 4), when a load carried by the vehicle has changed, when a suspension becomes unlocked after being locked, etc. In some embodiments, the system may be configured to respond as if a mismatch was identified any time that the target ride height changes based on a user input even if the new target ride height only deviates from the previous target ride height by a small amount. In some embodiments, the system may be configured to respond as if a mismatch was identified when the suspension becomes unlocked so that the system can maintain the vehicle at the target ride height by reacting to a change in ride height caused by a change in vehicle conditions (e.g. load carried by the vehicle) between the time that the suspension was locked and unlocked.

If a mismatch has been identified at block 516, processing circuit 222 may be configured to check to ensure that the requirements for changing ride height are met at block 518. The requirements at block 518 may include none, one, or more of those listed above for blocks 414, 420 and 426 (FIG. 4). If the requirements are not met, the system continues to monitor the ride height by returning to block 512. It should be understood that a processing circuit 222 that controls multiple systems could take other actions before returning to block 512.

According to one exemplary embodiment, adjusting ride height at block 316 (FIG. 2) could be done using a laddering technique. The "ladder" function may be used when adjusting a front and/or rear suspension up or down, while in an automatic suspension adjusting mode (e.g. where a processing circuit continuously monitors ride height to maintain a steady ride height), etc. The ladder function may be configured to switch the upward or downward motion between the left and right side and/or the front and back ends depending on the ride height sensor readings. The system continues to adjust the suspension in a ladder fashion up or down until an input from the operator is no longer received and/or until the vehicle is at the target ride height.

If a ride height change message is received, processing circuit 222 can pick a zone to start adjusting first. For example, in a system having independently controllable zones for different sides, if a down message is received the system can lower the highest side first, on the other hand if an up message is received, the suspension can raise the lowest side first. Processing circuit 222 may use criteria for when to switch to adjusting the other zone(s). For example, processing circuit 222 can switch when the difference between the ride heights indicated by the sensors for the two sides approaches or exceeds a threshold (e.g. one-half inch difference in ride height between the two sides).

As another example, if a system has independently controllable corners (divided by end—front and rear, and side—left and right), and if both front and rear down messages are received, then processing circuit 222 may be configured to control adjustment to start with one end of the vehicle and, within that end, start by laddering from side to side as described in the previous example. Additional switching can then occur between the front zones and the rear zones. For example, a criteria can be used to switch between ends being adjusted. For instance, processing circuit 222 may be configured to switch (when lowering ride height) to adjusting the second end once there is a threshold difference (e.g. 1") between the lowest measured ride height of (e.g. the lowest measured ride height of a side on) the first end and the highest measured ride height of the second end, or vice versa.

According to some embodiments having independent front and rear ends, during a laddering technique, processing circuit 222 may be configured to start with the end (front or rear) that was first indicated to be adjusted (e.g. by a user input, based on settings for a mode selected by a user, etc.). Processing circuit 222 may be configured to ladder to the front only if the front and rear are either both above ride height or both below ride height.

Another example for adjusting rear and front end ride height positions and the action to be taken includes if the front and rear are both below their target ride heights, processing circuit 222 can choose the lowest section and raise that until it is an amount (e.g. 1") above the other section of the vehicle, and then ladder the other section of the vehicle up to within an amount (e.g. 1") of the low section.

In some embodiments, when either the front is above its target ride height and rear is below its target ride height or the front is below its target ride height and the rear is above its target ride height, the front and rear can be adjusted at the same time, using side-to-side laddering for the front and the rear as described in a previous example above.

EXAMPLES

The following examples provide examples of systems implemented according to various features described above. These examples may provide further details and aspects of the various inventions described herein, and may include additional features not discussed above. These examples are provided to illustrate various features in some exemplary implementations, and are not intended to limit the scope of a claim provided in this application.

The various examples may be used in a common system, or may be used separate from each other. A device including each combination of examples is contemplated herein (including combined or not combined with features from the general discussion above), where each example includes some of the details, all of the details, or only the general concept of the feature described in each example.

The non-limiting examples include:

Example 1

In one example of downward adjustment, the suspension shall move down only when a down adjust input is received from the operator via a message from the display. The suspension shall utilize a "ladder effect" from right to left of the front and the rear suspension when operating in the down mode. The suspension will continue to move until it reaches the lower limit of the ride height sensor or until the operator stops sending a down input. In a front or rear suspension downward adjustment process, the display controls have priority when the LHS is not loading/unloading.

As to requirements for downward adjustment, the PTO does not have to be engaged to perform suspension down operation, the front hydraulic supply does not have to be engaged to perform suspension down operation, the rear hydraulic supply does not have to be engaged to perform suspension down operation, there are no requirements for any speed conditions for lowering the suspension, the front suspension and rear suspension shall go down at the same time using the laddering technique, and the suspension must be unlocked to perform down operation.

Example 2

In one example of upward adjustment, the suspension shall move up when an up adjust message is received from the operator. The suspension will continue to move up until it reaches the upper limit minus ½" of the ride height sensor or until the operator stops sending an up message, whichever is lower. Going to the full up causes the suspension to see higher than normal pressures. The suspension shall utilize a "ladder effect" from right to left of the front and the rear suspension when operating in the up mode in addition to the front to rear "ladder effect" if both front and rear up messages are received. The suspension shall check the gas pressure transducers to verify that they are below a threshold (e.g. 1750 psi) to raise. If the pressure transducer check passes, the suspension can then continue and make the upward adjustment requested by the operator. During raise, the system shall continue to monitor the gas pressure transducers. If they exceed the threshold, the function shall be aborted and a message sent to the display. The suspension shall cancel the up function, for that section of the vehicle (front or rear), until the operator prompts again for adjustment. In a front or rear suspension up process, the display controls have priority when the LHS is not loading/unloading.

As to requirements for downward adjustment, the PTO shall be engaged to perform suspension up operation (this shall be confirmed by a feedback message), the front hydraulic supply shall be engaged to perform a front suspension up operation, the rear hydraulic supply shall be engaged to perform a rear suspension up operation, the vehicle shall not perform up suspension adjustment if the speed is over 5 mph, and the suspension shall not be caused to attempt to adjust upwards if the suspension is locked.

Example 3

In one example of individually controlling for zones with a different switch dedicated to each zone, each zone has a separate raise and lower input for that zone. As long as the switch input is on for that zone, the system will perform the appropriate function (e.g. raise or lower) for that zone. The system will turn on the front or rear supply valve if a raise for that end on the truck is desired.

As to requirements, the PTO shall be engaged to perform a raise operation, speed must be less than 5 mph to perform a raise operation, gas pressure on the accumulators must be less than a threshold to perform a raise operation, the system must be unlocked for both raise and lower, all other suspension operations take priority over these operations, except LHS (if LHS mode is selected, these operations will be available), suspension cannot be in the process of unlocking or locking, and the system cannot have locking errors, or errors that prevent automatic or manual operations.

Example 4

In one example of using a load handling system remote operation, LHS remote operations are generated from the LHS system. The LHS will send messages containing the desired operations to the suspension control system. A message from LHS may be used to control front ride height, rear ride height, or both front and rear ride height. In this mode, all 4 corners of the vehicle may move at the same time, but all must move in the same direction.

As to requirements for this example, the PTO shall be engaged to perform a raise operation, speed must be less than 5 mph to perform a raise or lower operation, sas pressure on the accumulators must be less than a threshold to perform a raise operation, the system must be unlocked for both raise and lower, this operation will take precedence over the display controls, the system cannot have locking errors, or errors that prevent manual operations, an LHS mode must be active, and a remote power switch must be on. The PTO is turned on to do a raise function.

Example 5

An example of automatic suspension adjustment includes the vehicle is first be set up such that the ride height sensors are calibrated (e.g. read approximately 3.8 VDC at the full up suspension position which may be, for example, approximately 19.75" from the bottom of the frame rail to the center of the wheel). Adjusting the turnbuckle that links the ride height sensor to the control arm accomplishes setting the ride height. The suspension shall auto adjust, using the ladder function with left to right and front to rear laddering, only when an auto adjust message is received from the operator. The suspension shall auto adjust using PID control to accurately reach the selected ride height target within a certain range (e.g. +/-½"). ¾" is added to the target ride height to prepare for the pressure adjustment sequence after auto leveling. The system will monitor the level sensors and adjust the suspension up or down to the selected ride height level within the specified tolerance.

Prior to making upward adjustments, the system shall check the pressure transducers. If they exceed a threshold, the suspension shall send an error message and cancel the adjust function. During automatic adjustment, the system shall adjust the rear first then ladder to the front only if the front and rear are either, both above ride height or both below ride height. Once there is a difference of 1" between the lowest of the rear and the highest of the front, the front suspension shall be adjusted using the ladder function. When the front and rear are both below ride height, the suspension shall choose the lowest section (front/rear of the vehicle) and raise that until it is an inch above the other section of the vehicle then ladder the other section of the vehicle up to within an inch of the low section. When either the front is above ride height and rear is below or the front is below ride height and the rear is above ride height auto leveling the front and rear can be done at the same time, using side to side laddering for the front and the rear.

The suspension shall automatically adjust while the suspension auto adjust message is received. The LHS has priority over the cab controls. Automatic adjustment shall not be allowed while the LHS is operating. The right rear pressure transducer shall be below a threshold to go up. If the right rear pressure transducer voltage is measured at or above the threshold, the suspension shall send an error message to the drivers display. The right rear ride height sensor shall be compared to the target ride height and must be within a range (e.g. +/−½"). If the right rear ride height sensor is high, the right rear cylinder must be lowered. If the right rear ride height sensor is low, the right rear cylinder must be raised. The same is true of the components of the left rear zone, the right front zone, and the left front zone.

As to requirements for this example, if any gas pressure transducer is over a threshold, the suspension will not adjust up, the suspension shall only adjust when an input has been received from the operator, the suspension shall not make an upward adjust when the vehicle speed is over 5 miles per hour, the selected ride heights must be broadcast from the cabin controls (CTIS) or the load handling system remote control, and any LHS mode ride height will take priority over the CTIS for ride height target settings.

The pressure may be adjusted after out-leveling. This adjustment may be done after each Auto level sequence, regardless of ride height target, except Trailer ride height. The system adjusts to overshoot target range by a certain amount (e.g. ¾"+/−½"), and the accumulator pressure is recorded for each corners controlling accumulator. The suspension is then re-leveled to the desired ride height and the accumulator pressure is recorded for each corner. After the ride height is reached, the accumulator pressure is adjusted for each corner until the accumulator value is within a range of (e.g. +/−5 psi of) the calculated percentage of pressure that was recorded previously. The calculated percentage is determined by the amount of pressure needed to keep the suspension from traveling more than a certain amount (e.g. +/−1.5") from the targeted ride height while driving. This operation may only be accurate for keeping the suspension within the range for 75% of the time. Pressure is not adjusted in this manner after automatically adjusting the ride height to the trailer ride height.

Example 6

A truck may include a suspension charge function. The suspension charge function monitors the cap side pressure transducers. If these values are below a threshold (e.g. 250 psi) and the system is in power up, trying to perform an unlock operation, or when exiting maintenance mode, the system will perform a suspension charge function. The suspension turns on the lock, unlock, supply and raise outputs on that end of the vehicle, until the cap side pressure transducers read greater than the threshold. Once the threshold pressure is reached, the lock outputs are turned off, unlock is then turned turn off, and then outputs are supplied and raised. The front accumulators may be charged to a greater amount (e.g. 500 psi).

Example 7

An exemplary truck includes a suspension lock and unlock function. The suspension system controller monitors the pressure switches and cap side pressure transducers for locking and unlocking operations. The pressure switches indicate a "locked" condition when the switches are "off". If the pressure is greater than a threshold (e.g. 200 psi), the switch will turn "on" indicating an unlocked condition. All switches must be in the unlocked state for the system to be considered unlocked, otherwise the system is locked. An indicator on the dash (suspension locked) will match this state.

To perform a lock sequence a request will be received from a user. The controller will turn on the locking outputs on all corners for a time period (e.g. 2 seconds) and then turn them off. The controller will then verify that all pressure switches are "off" and update the indicator on the dash panel. If any switch is still "on", an error code will be set.

To perform an unlock sequence, if the suspension is currently locked and the locking request is no longer active, the system will go through an unlocking sequence. The system will verify that there is enough pressure in the cap side of the cylinders before an unlocking sequence is started. If the pressure is low on any of the cylinders, the system will need to charge first. Once adequate charging is verified, the cap pressure transducer on each locked corner is compared to the gas side pressure transducer that controls that cylinder (located on the opposite side of the truck). These pressures must be within a range (e.g. +/−25 psi) of each other. If any locked corner does not meet this condition, a prep of that corner must be done before unlocking can proceed. Also, if the gas side pressure transducer reads a lower value than the cap side pressure, the accumulator pressure is increased by turning on the raise output for that corner until the pressures are within the range of each other. If gas side pressure transducer reads higher than the cap side pressure, the accumulator pressure is decreased by turning on the lower output for that corner until the pressure are within the range of each other. This operation is repeated 3 times for each corner, one corner at a time. Once all corners are prepped all lock and unlock outputs are turned on. The lock outputs are left on for 2 seconds and the unlock outputs are left on for 4 seconds.

If a lock request for C-130, Trailer, Lift or Ground modes comes from the LHS system, the suspension will go through one lock sequence. If no lock request for C-130, Trailer, Lift or Ground modes comes from the LHS system, or when exiting maintenance mode, the suspension will go through one unlock sequence. The front right lock pressure transducer shall be compared to the axle 2 left gas pressure transducer. They must be equivalent (e.g. +/−25 PSI), when trying to unlock. The same is true for the other three corners of the vehicle.

The front suspension lock output is turned on to stop pressure from exiting the locking manifold, thus isolating the cylinders from the accumulators. The rear suspension lock output is turned on to stop pressure from exiting the locking manifold, thus isolating the cylinders from the accumulators. The front suspension unlock output and front suspension lock output are turned on to allow accumulator pressure to enter the locking manifold. This connects the cylinders to the accumulators. The rear suspension unlock output and front suspension lock output are turned on to allow accumulator pressure to enter the locking manifold. This connects the cylinders to the accumulators.

The front supply output is turned on when any of the front raise outputs are on. The rear supply output is turned on when any of the rear raise outputs are on.

As for requirements for this example, the system must be charged before an unlock sequence can occur. The system will go through an unlock sequence on power up. If an LHS mode that requires locking is selected relock after power up. If only one corner is locked during unlocking, the opposite side corner must be locked then both sides unlocked at the same time. Right front and left front are paired. Right rear and left rear are paired. Both front and rear sub-systems must be locked and unlocked at the same time, except in some circumstances. To perform an unlock sequence, the system must be in a locked state or be in power up. To perform a lock sequence, the system must be in an unlocked state. When unlocking, turn on all lock and unlock outputs. After 2 seconds turn off the lock outputs. After 4 seconds turn off unlock outputs. When locking, turn on locking outputs for 2 seconds then off.

Example 8

One mode selectable by a user is a trailer load/unload mode. The operator will select the trailer load/unload function on the LHS. The LHS will send a message to the ride height control system with the selection state. Once the trailer load/unload has been selected, the suspension shall use the trailer ride height as its new target. The operator must then select Auto level for the system to reach the trailer ride height target. Once the ride height is reached the suspension system will go through a lock sequence. When the function is deselected, the suspension shall unlock and resort to the most current previous ride height target.

If the LHS trailer load/unload state from the LHS is active, the ride height control system will use the trailer ride height for the load/unload mode as its new target height. If the LHS trailer load/unload state from the LHS is inactive, the ride height control system will use a ride height target from other sources.

Suspension lock outputs shall be turned on according to the lock section when the trailer load/unload mode is selected after the trailer ride height is reached. Suspension unlock outputs shall be turned on according to the unlock section when the trailer load/unload mode is deselected.

In the way of requirements, the LHS switch must be selected for the ride height control system to select trailer ride height as new target or the trailer mode must be selected on the cab control or the remote control for trailer ride height to be selected as the new target, and automatic ride height control must be selected and the trailer ride height acquired for the suspension to lock.

Example 9

One mode selectable by a user is a aircraft load mode. This operation prepares the vehicle for loading onto an aircraft for transport. The aircraft load function shall be controlled from the display through a message. When the operator selects the aircraft load function a new target ride height is set. The ride height control system shall make the aircraft ride height it's new target. The ride height control system shall then wait until the operator depresses the auto level switch to perform any height adjustments. Once the aircraft ride height is obtained, the system will not allow any LHS operations until the entire Aircraft/Transport mode is completed. The operator can now drive the vehicle onto an aircraft to prepare for vehicle transport. Once on the aircraft, the transport operations mode may be used by an operator.

The aircraft load message is sent from the display. An abort option is available until the ride height control system has reached the aircraft ride height. Once the aircraft ride height is selected, the operator selects auto level from the dash and the ride height control system levels to the aircraft ride height. Once at this height, the entire sequence must be completed to exit. The LHS mode is disabled in this mode.

Example 10

One mode selectable by a user is a transport mode. The transport function is controlled from the display through a message. The operator must enter and successfully attain aircraft load ride height before entering the transport mode. When the operator selects the transport function, the ride height control system will lower until all the cap pressure transducers read a small amount (e.g. less than about 10 psi). Driving is disabled in this mode. Once the system has no pressure left, the suspension will go through a charge sequence. This mode is recorded over power on/off cycles to prevent the vehicle from making ride height adjustments, other than back to aircraft height, or from driving without the proper ride height. When the vehicle is powered on, the display will default to the aircraft load screen. To remove the vehicle from the aircraft, auto level is selected. The ride height control system will return to the aircraft ride height and enable driving capabilities and LHS capabilities.

The transport message is sent from the display. Once selected, driving capabilities are removed until the system completes the transport mode activities. The suspension will lower all corners until the cap pressure transducers read less than a small, pre-set amount. The system will recharge immediately during power up. The system will level to aircraft ride height only, once the operator selects Auto level on the dash.

As for requirements, vehicle speed must be 0 MPH to enter transport mode, LHS mode is disabled, once transport mode is selected, vehicle movement is disabled until the sequence is finished and vehicle is returned to aircraft ride height, and the system is locked in transport mode until the sequence is completed, even through power cycles.

Example 11

One mode selectable by a user is an obstacle avoidance mode. The obstacle avoidance function shall monitor for an obstacle avoidance message. When the operator selects the obstacle avoidance mode, a new target ride height is set. The ride height control system shall compare this to the current ride height and turn on the suspension not level light if the target and current do not match. The ride height control system shall then wait until the operator depresses the auto level switch to perform any height adjustments. The operator must select the obstacle avoidance mode again to exit the function or select any manual suspension adjustment.

The suspension obstacle avoidance message shall be monitored continuously and shall be true when the message is confirmed from the chassis. The suspension obstacle avoidance message shall be sent to the chassis to turn on the indicator on the dash when the state is true. The vehicle speed must be below 5 MPH.

Example 12

The display may be used to operate the Calibration and Learn functions. The calibration function records the full up ride height values after they have been converted with an offset. The learn function will record the thresholds of the valves in both the up and down directions. The system must store the full up position value through a calibration procedure. An offset is used to make all the ride heights equal to the maximum ride height (e.g. 19.75"). The down limit value is calculated from the calibrated full up suspension value.

Example 13

Exemplary ride height targets for an exemplary truck in various modes include:

| Ride Height Target (inches from center of the axle to rails) | CTI Mode | Other Modes | Active Speed Range |
|---|---|---|---|
| 11.5 | Hwy | | 0-60 MPH |
| 13" | Cross Country | | 0-45 MPH |
| 14" | Mud/Sand/Snow | | 0-15 MPH |
| 14" | Emergency | | 0-10 MPH |
| 15.25" | | Obstacle Avoidance | 0-10 MPH |

-continued

| Ride Height Target (inches from center of the axle to rails) | CTI Mode | Other Modes | Active Speed Range |
|---|---|---|---|
| 19.25" | | LHS Trailer Ld/Unld | 0-10 MPH |
| 10" | | C-130 Load/Unload | 0-10 MPH |
| 13" | | Aircraft Load | 0-10 MPH |
| 19.75" | | Fully Raised | |

Additional Features

Processing circuit 222 can include various types of processing circuitry, digital and/or analog, and may include one or more of a microprocessor, microcontroller, application-specific integrated circuit (ASIC), field programmable gate array (FPGA), or other circuitry configured to perform various input/output, control, analysis, and other functions. In various embodiments, the processing circuit 222 may include a central processing unit (CPU) using any suitable processor or logic device, such as a as a general purpose processor. Processing circuit 32 may include, or be implemented as, a chip multiprocessor (CMP), dedicated processor, embedded processor, media processor, input/output (I/O) processor, co-processor, a microprocessor such as a complex instruction set computer (CISC) microprocessor, a reduced instruction set computing (RISC) microprocessor, and/or a very long instruction word (VLIW) microprocessor, a processor implementing a combination of instruction sets, a controller, a microcontroller, an application specific integrated circuit (ASIC), a field programmable gate array (FPGA), a programmable logic device (PLD), or other processing device in accordance with the described embodiments.

Processing circuit 222 may be configured to digitize data, to filter data, to analyze data, to combine data, to output command signals, and/or to process data in some other manner. Processing circuit 222 may be configured to perform digital-to-analog conversion (DAC), analog-to-digital conversion (ADC), modulation, demodulation, encoding, decoding, encryption, decryption, etc. Processing circuit 222 (e.g. a microprocessor) may be configured to execute various software programs such as application programs and system programs to provide computing and processing operations for the system.

Processing circuit 222 may also include a memory that stores data. Processing circuit 222 may include only one of a type of component (e.g. one microprocessor), or may contain multiple components of that type (e.g. multiple microprocessors). Processing circuit 222 could be composed of a plurality of separate circuits and discrete circuit elements. In some embodiments, processing circuit 222 will essentially comprise solid state electronic components such as a microprocessor (e.g. microcontroller). Processing circuit 222 may be mounted on a single board in a single location or may be spread throughout multiple locations which cooperate to act as processing circuit 222. In some embodiments, processing circuit 222 may be located in a single location and/or all the components of processing circuit 222 will be closely connected.

Components shown as part of a single processing circuit 222 in the figures may be parts of separate processing circuits in various embodiments covered by the claims unless limited by the claim to a single processing circuit The vehicle may include a plurality of displays and a data logger. The displays may permit any of the data collected by a control system to be displayed in real time, and/or display warning messages. The displays may include membrane pushbuttons that allow the operators to scroll through, page through, or otherwise view the screens of data that are available. The membrane pushbuttons may also allow operators to change values of parameters in the control system. The data logger may be used to store information regarding the operation of the vehicle. The data logger may be used as a "black box recorder" to store information logged during a predetermined amount of time (e.g., thirty seconds) immediately prior to the occurrence of one or more trigger events (e.g., events indicating that the vehicle has been damaged or rendered inoperative, such as when an operational parameter such as an accelerometer threshold has been exceeded).

In some embodiments, the control system, the operator interface (e.g. display), and indicators are mounted on severe duty military trucks, and each may be located on either or both of cab and chassis positions.

In many embodiments, this equipment shall be capable of functioning after being exposed to various environmental extremes (i.e. High Moisture Exposure, Low/High Temperature, Shock, Vibration, etc.). Examples of environmental extremes through which a system mounted on a severe duty military truck are discussed in various technical requirement publications, including those discussed above.

In many embodiments, the electrical controls (e.g. processing circuit and/or communication modules connected to the processing circuit) for the ride height adjustment system (e.g. the hydraulic suspension) are designed as a Line Replaceable Unit (LRU) to facilitate ease of field replacement/servicing.

While there are multiple ways of adjusting a ride height which are contemplated by this document, one method of adjusting ride height is by adjusting a suspension of the system. Any reference in the application to adjusting ride height is equally applicable to adjusting a suspension system, and any section relating to monitoring ride height is equally applicable to monitoring a suspension system.

Also, the various examples, figures, and flow charts provided in this application are only exemplary, are not the only means of carrying out the invention claimed in the claims, and are not meant to limit the scope of the claims below unless expressly required by statute.

The examples are provided to be illustrations of an exemplary system. A truck may have one or more of the exemplary modes that affect ride height described in the preceding examples. A truck that include modes with purposes similar to those understood from the ordinary meaning of the words used the claim are intended to be covered by the claim, even though the truck may not possess the features in the examples and/or may posses different or additional features than provided by the example.

While shown as a system with singular components above, any of the systems discussed above may include redundant components which duplicate the functions of all or parts of the system. Additionally, any vehicle according to the claims below may have multiple systems that interact. For example, a vehicle may have a ride height control system that includes a microprocessor that is configured to interface with other microprocessors configured to monitor and/or control other vehicle conditions. The microprocessor of the ride height control system may be a master processor and/or may be a lave processor.

What is claimed is:

1. A land vehicle comprising:
   sensors configured to provide information relating to a ride height of the land vehicle, the ride height being related to a distance from an axle center to vehicle rails;
   a user input device configured to receive user input from a user of the vehicle, the user input comprising a selection of a mode from among a plurality of modes, the plurality of modes comprising a manual up mode, a manual down mode, and a plurality of automatic modes, wherein each of the plurality of automatic modes is associated with an action that can be performed using the vehicle and an automatic mode is activated responsive to receiving a user selection of a descriptive representation of the action associated with the automatic mode, wherein each of the plurality of automatic modes has an associated mode target ride height, wherein at least one of the automatic modes is an automatic loading mode, and wherein the automatic loading mode is associated with an action of loading the land vehicle onto a transport vehicle for transport and has an associated loading mode target ride height that is suitable for loading the land vehicle onto the transport vehicle; and
   a processing circuit configured to determine a target ride height based on the mode selected by the user,
   wherein the processing circuit configured to monitor data from the sensors and to output a signal configured to cause adjustment of one or more vehicle systems that affect a vehicle ride height based on the data from the sensors and the target ride height, wherein the processing circuit is configured to cause the one or more vehicle systems to alternately adjust heights of at least one of opposing sides and opposing ends of the vehicle until the ride height has reached the target ride height, wherein the processing circuit is configured to cause the one or more vehicle systems to
      adjust a first height of a first side or end until a difference between the first height and a second height of an opposing second side or end exceeds a threshold,
      adjust the second height of the second side or end in a same direction in which the first height was adjusted, wherein the second height is adjusted until the difference between the first height and the second height exceeds the threshold, and
      continue adjusting the first height of the first side or end and the second height of the second side or end in an alternating manner until at least one of the first height and the second height reaches or passes the target ride height.

2. The land vehicle of claim 1, further comprising a suspension and a suspension control system, wherein the processing circuit is configured to output a signal to the suspension control system based on the data from the sensors.

3. The land vehicle of claim 1, wherein the user input device comprises a touch screen display configured to present the plurality of modes to the user, wherein the display is configured to present, for each of the plurality of automatic modes, the representation of the predetermined operating function associated with the respective automatic mode, wherein the touch screen display is configured to receive a user selection of an automatic mode through the user touching the representation of the associated operating function on the touch screen display.

4. The land vehicle of claim 1, wherein the predetermined operating functions represented by the plurality of automatic modes comprise at least one of an obstacle avoidance mode, a trailer load/unload mode, an aircraft mode, and a transport mode.

5. The land vehicle of claim 1, further comprising a speed sensor configured to measure a speed of the vehicle, wherein the processing circuit is configured to set the target ride height to the mode target ride height of the selected automatic mode when the speed of the vehicle is equal to or below a maximum speed associated with the selected automatic mode.

6. The land vehicle of claim 1, wherein the processing circuit is configured to cause the one or more vehicle systems to alternately adjust heights of a left side and a right side of the vehicle until the ride height has reached the target ride height, wherein the processing circuit is configured to cause the one or more vehicle systems to:
   adjust one of a left side height of the left side and a right side height of the right side until a difference between the left side height and the right side height exceeds a threshold,
   adjust the other of the left side height and the right side height in a same direction in which the previous adjustment was made until the difference between the left side height and the right side height exceeds the threshold, and
   continue adjusting the left side height and the right side height in an alternating manner until at least one of the left side height and the right side height reaches or passes the target ride height.

7. The land vehicle of claim 1, wherein the processing circuit is configured to cause the one or more vehicle systems to alternately adjust heights of a front end and a back end of the vehicle until the ride height has reached the target ride height, wherein the processing circuit is configured to cause the one or more vehicle systems to:
   adjust one of a front end height of the front end and a back end height of the back end until a difference between the front end height and the back end height exceeds a threshold,
   adjust the other of the front end height and the back end height in a same direction in which the previous adjustment was made until the difference between the front end height and the back end height exceeds the threshold, and
   continue adjusting the front end height and the back end height in an alternating manner until at least one of the front end height and the back end height reaches or passes the target ride height.

8. The land vehicle of claim 1, wherein the processing circuit is configured to cause the one or more vehicle systems to alternately adjust heights of a front end and a back end of the vehicle until the ride height has reached the target ride height, wherein the processing circuit is configured to cause the one or more vehicle systems to:
   adjust a first end height of a first end of the vehicle until a difference between the first end height and a second end height of a second end of the vehicle exceeds a threshold, wherein the processing circuit is configured to cause the one or more vehicle systems to adjust the first end height by adjusting heights of a first side of the first end and a second side of the first end in an alternating manner until a difference between the second end height and at least one of the heights of the first side and the second side of the first end exceeds the threshold,
   adjust the second end height in a same direction in which the first end height was adjusted until a difference between the first end height and the second end height exceeds the threshold, wherein the processing circuit is configured to cause the one or more vehicle systems to adjust the second end height by adjusting heights of a first side of the second end and a second side of the second end in an alternating manner until a difference between the first end height and at least one of the heights of the first side and the second side of the second end exceeds the threshold, and continue adjusting the first end height and the second end height in an alternating manner until at least one of the first end height and the second end height reaches or passes the target ride height.

9. The land vehicle of claim 1, wherein, once at least one of the first end height and the second end height reaches or passes the target ride height, the processing circuit is configured to cause the one or more vehicle systems to simultaneously adjust a the first end height and the second end height until both the first end height and the second end height are approximately equal to the target ride height.

10. The land vehicle of claim 1, wherein the processing circuit is configured to monitor the data from the sensors in order to maintain the ride height of the vehicle at substantially the same height, and is configured to output the signal to cause adjustment in response to a change in vehicle ride height.

11. The land vehicle of claim 10, wherein the ride height at which the processing circuit is configured to maintain the vehicle is a height based on the selected mode.

12. The land vehicle of claim 10, wherein the ride height at which the processing circuit is configured to maintain the vehicle is adjustable.

13. The land vehicle of claim 1, further comprising:
a suspension system connected to the wheels of the vehicle; and
the processing circuit configured to control the suspension system, wherein the processing circuit can control the suspension system to adjust each wheel zone height independent of the other wheel zone heights.

14. The land vehicle of claim 13, wherein the processing circuit is configured such that it can control the suspension system to have any of a plurality of height settings.

15. The land vehicle of claim 13, wherein the processing circuit is configured to control a height setting of the suspension system by outputting a control signal configured to control a hydraulic system to adjust the height setting of the suspension system.

16. The land vehicle of claim 13, wherein the processing circuit is configured to control the height settings of the suspension system in response to a user input.

17. The land vehicle of claim 16, wherein the processing circuit is configured to maintain the suspension at a height setting that is set in response to the mode selected by the user based on data from sensors configured to monitor data relating to the height of the suspension.

18. The land vehicle of claim 13, wherein
the suspension system is a first suspension system;
the land vehicle further comprises a second suspension system; and
the processing circuit is further configured to control a height of the second suspension system.

19. The land vehicle of claim 18, wherein the processing circuit is configured such that the first suspension system and the second suspension system may have different height settings.

20. The land vehicle of claim 18, further comprising a third suspension system and a fourth suspension system.

21. The land vehicle of claim 20, wherein the processing circuit is configured to control the first suspension and the second suspension based on a first height setting, and is configured to control the third suspension and the fourth suspension based on a second height setting.

22. The land vehicle of claim 21, wherein the processing circuit is configured to always control the first suspension based on the same height setting used to control the second suspension.

23. A land vehicle comprising:
a ride height control system configured to adjust a ride height of the land vehicle, the ride height being related to a distance from an axle center to vehicle rails;
a user input device configured to receive user input from a user of the vehicle, the user input comprising a selection of a mode from among a plurality of modes, the plurality of modes comprising a manual up mode, a manual down mode, and a plurality of automatic modes, wherein each of the plurality of automatic modes is associated with an action that can be performed using the vehicle and an automatic mode is activated responsive to receiving a user selection of a descriptive representation of the action associated with the automatic mode, wherein each of the plurality of automatic modes has an associated mode target ride height; and
a processing circuit configured to determine a target ride height based on the mode selected by the user; and
the processing circuit configured to output a signal configured to control the ride height control system, the processing circuit configured to control the ride height control system based on the selected mode and the target ride height,
wherein, responsive to receiving the signal from the processing circuit, the ride height control system is configured to alternately adjust heights of a front end and a back end of the vehicle until the ride height has reached the target ride height, wherein the ride height control system is configured to:
adjust a first end height of a first end of the vehicle until a difference between the first end height and a second end height of a second end of the vehicle exceeds a threshold, wherein the ride height control system is configured to adjust the first end height by adjusting heights of a first side of the first end and a second side of the first end in an alternating manner until a difference between the second end height and at least one of the heights of the first side and the second side of the first end exceeds the threshold,
adjust the second end height in a same direction in which the first end height was adjusted until a difference between the first end height and the second end height exceeds the threshold, wherein the ride height control system is configured to adjust the second end height by adjusting heights of a first side of the second end and a second side of the second end in an alternating manner until a difference between the first end height and at least one of the heights of the first side and the second side of the second end exceeds the threshold, and
continue adjusting the first end height and the second end height in an alternating manner until at least one of the first end height and the second end height reaches or passes the target ride height.

24. The land vehicle of claim 23, wherein each of the plurality of automatic modes corresponds to a target ride height.

25. The land vehicle of claim 23, wherein the user input is an input of non-height information.

26. The land vehicle of claim 23, wherein the processing circuit configured to control the ride height control system based on receipt of a user input corresponding to a function requested by a user.

27. The land vehicle of claim 23, wherein the processing circuit configured to control the ride height control system based on receipt of a user input of a load handling system mode.

28. The land vehicle of claim 23, wherein the user input device comprises a touch screen display configured to present the plurality of modes to the user, wherein the display is configured to present, for each of the plurality of automatic modes, the representation of the predetermined operating function associated with the respective automatic mode, wherein the touch screen display is configured to receive a user selection of an automatic mode through the user touching the representation of the associated operating function on the touch screen display.

29. The land vehicle of claim 23, wherein the predetermined operating functions represented by the plurality of automatic modes comprise at least one of an obstacle avoidance mode, a trailer load/unload mode, an aircraft mode, and a transport mode.

30. The land vehicle of claim 23, further comprising a speed sensor configured to measure a speed of the vehicle, wherein the processing circuit is configured to set the target ride height to the mode target ride height of the selected automatic mode when the speed of the vehicle is equal to or below a maximum speed associated with the selected automatic mode.

31. The land vehicle of claim 23, wherein, once at least one of the first end height and the second end height reaches or passes the target ride height, the ride height control system is configured to simultaneously adjust a the first end height and the second end height until both the first end height and the second end height are approximately equal to the target ride height.

* * * * *